(12) United States Patent
Haddock

(10) Patent No.: US 6,470,629 B1
(45) Date of Patent: Oct. 29, 2002

(54) MOUNTING SYSTEM AND ADAPTOR CLIP

(76) Inventor: Robert M. Haddock, 8655 Table Butte Rd., Colorado Springs, CO (US) 80908

( * ) Notice: Subject to any disclaimer, the term of this patent is extended or adjusted under 35 U.S.C. 154(b) by 0 days.

(21) Appl. No.: 09/313,103

(22) Filed: May 17, 1999

(51) Int. Cl.[7] .............................................. E04D 13/00
(52) U.S. Cl. .................... 52/24; 52/506.08; 52/508; 52/542; 52/713; 52/714; 52/745.12; 248/200; 248/214; 248/221.11; 248/223.31
(58) Field of Search .............................. 52/506.08, 713, 52/714, 508, 542, 745.12, 511, 24; 248/200, 214, 221.11, 223.31

(56) References Cited

U.S. PATENT DOCUMENTS

| | | |
|---|---|---|
| 473,512 A | 4/1892 | Laird |
| 529,774 A | 11/1894 | Baird |
| 939,516 A | 11/1909 | Laird |
| 1,230,363 A | 6/1917 | Baird |
| 2,079,768 A | 5/1937 | Levow ........................ 108/27 |
| 2,201,320 A | 5/1940 | Place ........................ 108/27 |
| 5,224,427 A | 7/1993 | Riches et al. ................ 104/114 |
| 5,228,248 A | 7/1993 | Haddock ........................ 52/25 |
| 5,271,194 A | 12/1993 | Drew ........................... 52/25 |
| 5,483,772 A | 1/1996 | Haddock ........................ 52/25 |
| 5,491,931 A | 2/1996 | Haddock ........................ 52/25 |
| 5,613,328 A | 3/1997 | Alley ........................... 52/25 |
| 5,694,721 A | * 12/1997 | Haddock ........................ 52/24 |
| 5,715,640 A | 2/1998 | Haddock ...................... 52/545 |
| 6,088,979 A | * 7/2000 | Neal ........................... 52/212 |

FOREIGN PATENT DOCUMENTS

| | | | |
|---|---|---|---|
| AT | 298762 | 5/1972 | .......... E04D/13/10 |
| DE | 3728-831 A | 8/1987 | .......... E04D/13/10 |
| FR | 1215468 | 2/1959 | |

OTHER PUBLICATIONS

U.S. application No. 08/987,368, Haddock, filed Dec. 9, 1997.
U.S. application No. 09/312,013, Haddock, filed May 14, 1999.

* cited by examiner

Primary Examiner—Beth A. Stephan
Assistant Examiner—Christy M. Green
(74) Attorney, Agent, or Firm—Marsh Fischmann & Breyfogle LLP

(57) ABSTRACT

An apparatus for securing members to a surface. The apparatus includes a mounting clamp, a mounting adaptor, a panel support member and a fastener. The panel support member and the mounting adaptor are slidably interconnected to one another. The mounting adaptor is fixedly interconnected to the mounting clamps using the fastener. The mounting adaptor may also include an area of reduced strength to permit the controlled failure of the apparatus in response to excess loading. The panel support member may be adapted to receive a panel. When installed on a surface, the apparatus obscures the view of mounting devices or equipment that may also be secured to the surface.

35 Claims, 3 Drawing Sheets

MOUNTING SYSTEM AND ADAPTOR CLIP

FIELD OF THE INVENTION

The present invention relates to adaptors used to secure members to two or more mounting locations on a surface. In particular, the invention relates to adaptors used for mounting panel support members to two or more mounts secured to a building surface.

BACKGROUND OF THE INVENTION

With the increased use of sheet metal panels in building construction, there has been an increased need to address ways in which various building attachments can be interconnected with a metal panel surface. For instance, there is often a need to attach heating and ventilation equipment, or other equipment to the roofs of buildings. Often, occupants and owners of buildings prefer that the brackets and support members used to secure such equipment to the building surface, as well as the equipment itself, remain hidden from view. However, providing a panel for obscuring the view of the mounting equipment has proven to be expensive and time consuming. Furthermore, the existing systems may cause damage to the surfaces to which they are attached should they be subjected to heavy stresses, such as when ice accumulates behind the panel or structure.

Existing systems for providing panels or structures to obscure mounting devices or equipment can be inflexible, and may require a relatively large amount of hand fitting to accommodate non-conventional installations. Examples of such non-conventional installations include those where the mounts to which the structure or panel is to be attached are themselves attached to ridges on metal roofs that are at nonstandard distances from each other. Other non-conventional installations include those where the structure or panel is to be attached to a metal roof having raised portions and the structure or panel is not perfectly perpendicular to the raised portions.

Systems for positioning panels so that they obscure the view of brackets or equipment mounted to building surfaces generally consist of members having a flat panel portion for obscuring the view of the brackets or equipment, and a mounting portion extending from the back of the panel portion at an angle that is substantially perpendicular to the panel portion. On such systems, the mounting portion is typically provided with holes for receiving fastening means. Generally, fastening means are positioned in the provided holes, and received by mounting devices secured at intervals along the roof. If the intervals at which the mounting devices are provided do not correspond to the distance between the holes in the mounting surface of the panel, new holes need to be drilled before the panel can be installed. Such custom fitting leads to increased costs and assembly time, because the installer must measure the required distance between holes, and then create holes in the mounting surface of the panel before the panel can be installed.

It would be advantageous to provide a mounting adaptor that can be attached to mounting brackets that are spaced at any interval along a surface. It would be advantageous to provide a mounting adaptor that is capable of being reliably and easily installed, to insure that its benefits are more readily attained. It would be advantageous to provide a mounting adaptor that is inexpensive to manufacture.

SUMMARY OF THE INVENTION

The present invention is generally directed towards a mounting adaptor and a mounting system that may be used to secure panels or structures to two or more mounting devices. Typically, these mounting devices are located on the exterior surface of a building. However, the present invention may be used in any application where a structure or member is to be attached to two or more mounting devices. In addition, the adaptor may be used to interconnect a member to a mounting surface through a mounting device at any point along the member. Although the present invention will generally be described in regard to attachment to a building surface, it will be appreciated that the invention may be used in connection with any situation in which it is desirable to attach a member to a mounting surface.

In one aspect of the present invention, a mounting adaptor is provided having a first portion adapted to be affixed to a mounting device. The mounting adaptor further includes a second portion adapted to slidably receive a panel support member. The mounting adaptor further features an area of reduced strength, to insure that excessive loading of the mounting adaptor results in a clean and predictable separation from the mounting device. In a preferred embodiment, the portion adapted to slidably receive a panel support member comprises a bead. In a more preferred embodiment, the mounting adaptor is manufactured from aluminum. In a most preferred embodiment, the mounting adaptor further comprises an alignment portion for holding the panel support member at an angle to the mounting adaptor.

In another aspect of the present invention, a mounting assembly is provided comprising at least two separate mounting devices interconnectable with a surface at two locations. The mounting assembly further includes at least two clip members interconnected to the mounting devices, wherein the clip members are provided with a beaded portion. A panel support member having a channel adapted to slidably receive the beaded portion of the clip members and a second channel adapted to receive a panel member is also provided. A panel member may then be positioned in the second channel portion of the panel support member. Thus, the mounting assembly positions the panel member apart from and at an angle to the mounting surface. In a preferred embodiment, the mounting assembly comprises clip members that have an area of reduced strength. In a further preferred embodiment of the mounting assembly, the area of reduced material comprises a line formed in the surface of the clip member. In another preferred embodiment, the mounting assembly positions the panel member at an angle to the mounting surface of about 90°.

In yet another aspect of the present invention, a roof assembly is provided. The roofing surface to which the assembly is to be attached includes a plurality of spaced longitudinal raised portions that are each laterally separated by a base portion, for example, a raised metal seam roof. At least two separate clamp or mounting members are interconnected to the raised portions of the building surface. A clip member or mounting adaptor having an attachment portion, a bead portion, and an alignment portion is secured to each of the clamp members using fasteners extending through holes in the attachment portion of the clip members. The clip members are further provided with an area of reduced strength. A panel support member having first and second channel portions and an alignment portion is interconnected to the clip members using the first channel portion. Panel members are then slidably received by the second channel portion of the panel support member. The alignment portion of the panel support member holds the panel member at an angle to the roofing surface, such that a view of objects behind the panel are obscured from observers. In a preferred embodiment, the area of reduced strength of the clip member comprises a formed line. In another preferred embodiment, the fastener comprises a bolt.

In a further embodiment, the invention provides a mounting adaptor for attaching a panel support member to a roof to obstruct a view of objects behind the member. The mounting adaptor has an attachment portion having a hole therethrough for receiving a fastener so that the mounting adaptor may be affixed to a mounting device. The attachment portion of the mounting adaptor is substantially a first thickness, but has a portion that is reduced to a second thickness along a line extending across at least a portion of the hole. The mounting adaptor further includes a bead portion for slidably receiving a panel support member. An alignment portion on the mounting adaptor holds the panel support member at an angle to the mounting adaptor. In another preferred embodiment, the mounting adaptor is affixed to the mounting device using a threaded fastener. In a further preferred embodiment, the mounting adaptor is constructed from aluminum. In another preferred embodiment, the alignment portion of the mounting adaptor is an alignment surface.

In an additional embodiment, the present invention provides a method for obscuring the view of certain objects. The method includes affixing at least two mounting members to a surface. At least two adaptor members having an attachment portion, a bead portion, and an alignment portion are provided. A panel support member having a first channel portion adapted to slidably receive the beaded portion of the adaptor members is engaged with the adaptor members. A first adaptor member is then positioned along the panel support member to a first position. The first adaptor member is then affixed to a first of the mounting members. The second adaptor member, also engaged with the first portion of the panel support member, is then positioned along the panel support member so that it is aligned with the second mounting member. The second adaptor member is then affixed to the second mounting member, whereby the panel support member is spaced apart from and at an angle to the surface. In a preferred embodiment, the panel support member is provided with a second channel for slidably receiving a panel member. In another preferred embodiment, the attachment portion of the adaptor member is provided with a hole therethrough to allow the adaptor member to be affixed to the mounting member using a threaded fastener.

DETAILED DESCRIPTION

In accordance with the present invention, an apparatus and method are provided to permit the easy and economical installation of panel members and structures to a surface. In particular, the present invention is directed to securing panel members to building surfaces.

Figure 1:
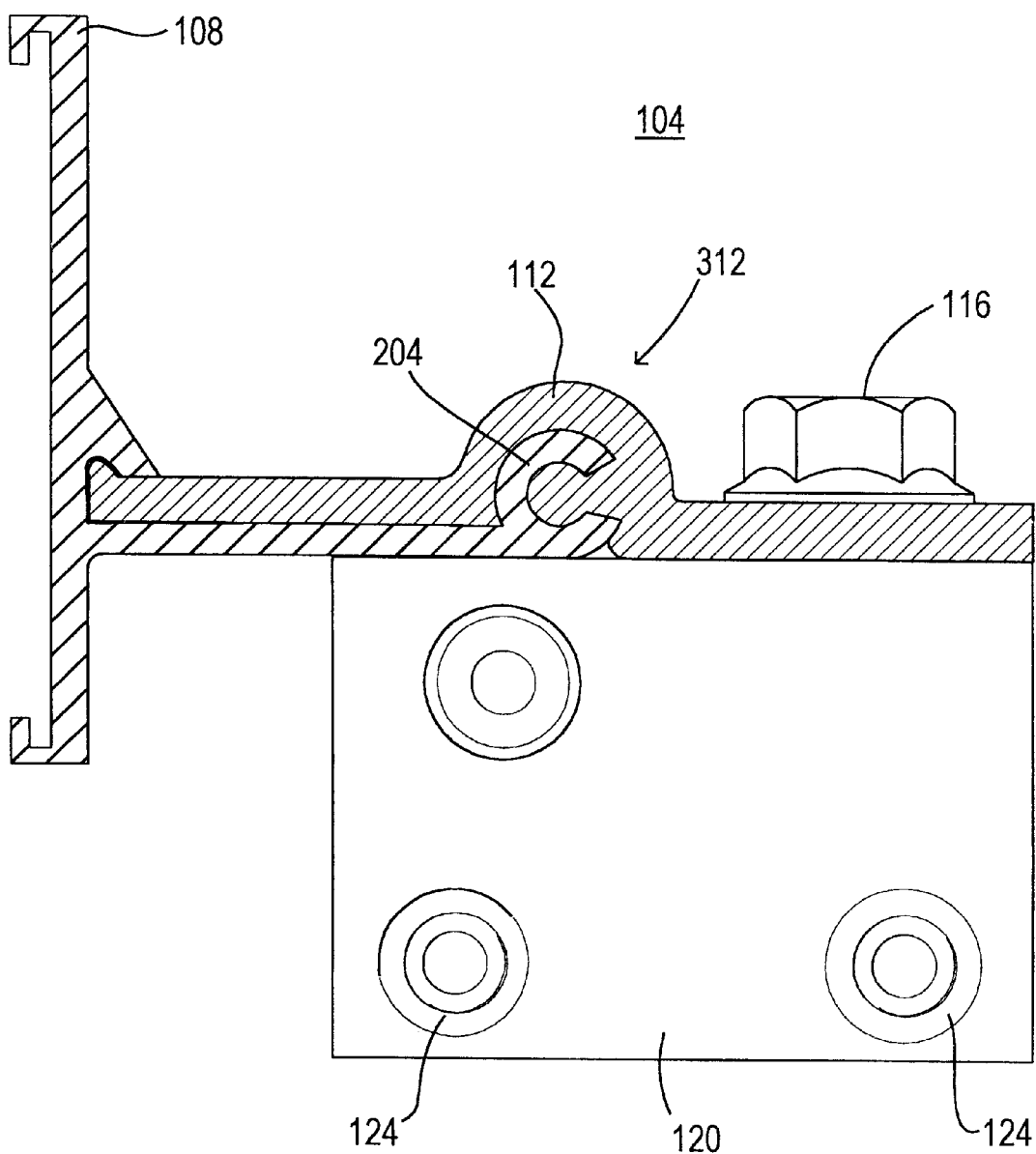
FIG. 1 is a side elevation of the components of a system for attaching panel members to a surface according to one embodiment of the invention.

With reference to FIG. 1, an apparatus constructed in accordance with one embodiment of the present invention is generally identified as mounting system 104. The mounting system 104 generally comprises a panel support member (or cross member) 108, a mounting adaptor (or clip member) 112, a fastener 116, and a mounting clamp 120. The panel support member 108 spans the distance between at least two adjacent mounting clamps 120 while the mounting adaptor 112 provides an interface between the panel support member 108 and the mounting clamp 120. Specifically, the mounting adaptor 112 engages the panel support member 108 in such a way that movement of the panel support member 108 with respect to the mounting adaptor 112 can only occur along a line perpendicular to the view illustrated in FIG. 1. The fastener 116 secures the mounting adaptor 112 to the mounting clamp 120, and additionally serves to clamp the panel support member 108.

The components of the mounting system 104 may be formed from various materials, such as metal and alloys of metal, ceramics, plastics, or composites. In the embodiment illustrated in FIG. 1, the panel support member 108, the mounting adaptor 112 and the mounting clamp 120 are formed from aluminum, which provides sufficient load-bearing capacity, while being corrosion resistant. Anodized aluminum and stainless steel are also materials that are particularly well-suited for constructing the components of the mounting system 104. The fastener 116 can be formed from galvanized steel, stainless steel, steel, aluminum, brass, or any other material having sufficient tensile strength. Preferably, the fastener 116 is formed from a material that is resistant to corrosion. Corrosion resistance is a desirable attribute for the materials from which all the components of the mounting system 104 are constructed, as it provides for enhanced durability and appearance, particularly where the system is used on the exterior surface of a building, or in other applications where it is out-of-doors and is exposed to the elements. The panel support member 108 and the mounting adaptor 112 may be formed by a variety of methods, one of which is extrusion. The mounting clamp 120 and the fastener 116 may be formed by conventional machining or forming techniques.

The mounting clamp 120 typically has a slot formed in it for receiving the raised portion of the surface to which the clamp is to be affixed. Fastening members 124 may be provided in the mounting clamp to engage the raised portion of the mounting surface. Suitable fasteners 124 include screws or bolts threadably attached to the mounting body 120 through holes that communicate with the slot formed in the mounting body 120. Suitable mounting clamps are disclosed in U.S. Pat. No. 5,228,248 issued Jul 20, 1993, U.S. Pat. No. 5,483,772 issued Jan. 16, 1996, U.S. Pat. No. 5,715,640 issued Feb. 10, 1998, and U.S. patent application Ser. No. 08/987,368, filed on Dec. 9, 1997, the disclosures of which are incorporated by reference herein.

Figure 2:
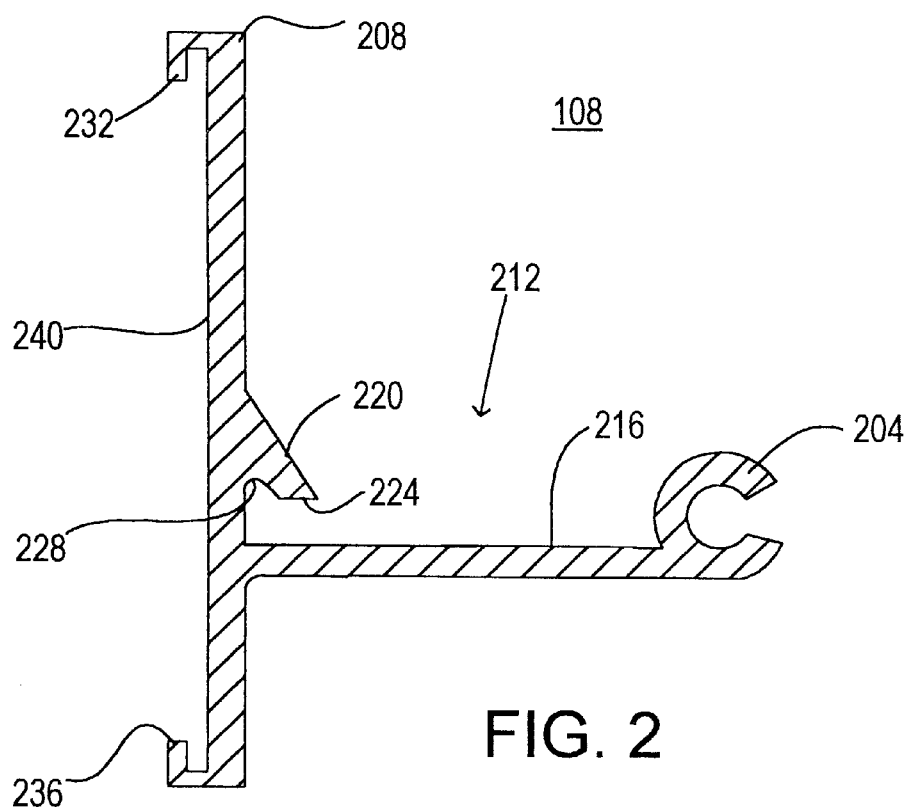
FIG. 2 is a cross-section of a panel support member constructed in accordance with one embodiment of the present invention.

A cross-section of the panel support member 108 is illustrated in FIG. 2. The panel support member 108 generally includes a first channel portion 204 adapted to slidably receive the mounting adaptor 112. Although in the illustrated embodiment the first channel portion 204 is illustrated as having a generally C-shaped cross section, other configurations are also contemplated by this invention. For example, rather than having a smooth, arcuate shape, the first channel portion 204 may be constructed from a series of straight segments. All that is required of the first channel portion 204 is that it be capable of slidably receiving the mounting adaptor 112 in a direction parallel to the longitudinal axis of the panel support member 108, while resisting movement of the panel support member 108 relative to the mounting adaptor 112 in all other directions.

The longitudinal axis of the panel support member 108 is along a line perpendicular to the cross section of the panel support member 108 illustrated in FIG. 2. The panel support member 108 is typically supplied in lengths ranging from about 16 inches to about 24 feet. More preferably, the panel support member 108 is available in lengths of up to about 20 feet. Most preferably, the panel support member 108 is provided in lengths of about 8 feet. The cross section of the panel support member 108 is generally constant across its entire length. Opposite the first channel portion 204 is the upright 208. Located generally between the upright 208 and the channel portion 204 is the alignment portion 212. The alignment portion 212 generally includes a planar upper alignment surface 216 and an alignment leg 220. The alignment leg 220 protrudes from upright 208 and is positioned such that the distal portion 224 of the alignment leg 220 is opposite the upper alignment surface 216. An alignment channel 228 is formed at the intersection of the alignment leg 220 and the upright 208. Certain embodiments of the panel support member 108 also include holes at regular intervals along and through the alignment portion 212 for direct attachment of the panel support member 108 to mounting clamps 120, without the use of mounting adaptors 112. When the panel support member 108 is to be attached directly to mounting clamps 120, the mounting clamps 120 are typically turned 180° to bring the hole (not shown) to receive the fastener 116 closer to the support member 108, thereby allowing the upright 208 of the panel support member 108 to clear the mounting clamp 120. Preferably, when the mounting clamp 120 is in a first position, the hole in the mounting clamp 120 for receiving the fastening the device 116 will align with the hole 328 in the mounting adapter 112, and when the mounting clamp 120 is turned 180° the hole in the mounting clamp 120 will align with hole in the panel support member 108. Such a configuration enhances the versatility of the system.

In the illustrated embodiment, the upright 208 is substantially perpendicular to the upper alignment surface 216. However, this angle may be varied to suit the particular installation. An upper U-shaped channel 232 and a lower U-shaped channel 236 may be formed at both the top and bottom of the upright portion 208. Together, upper U-shaped channel 232 and lower U-shaped channel 236 form the second channel portion 240 of the panel support member 108. The second channel portion 240 is adapted to receive strips (e.g., planar strips) of material (not illustrated), such as metal roofing material. The width of the second channel portion 240 (i.e. the distance between the upper U-shaped channel 232 and lower U-shaped channel 236) may vary, but is preferably less than about 12", more preferably less than about 6", and most preferably about 2".

Figure 3:
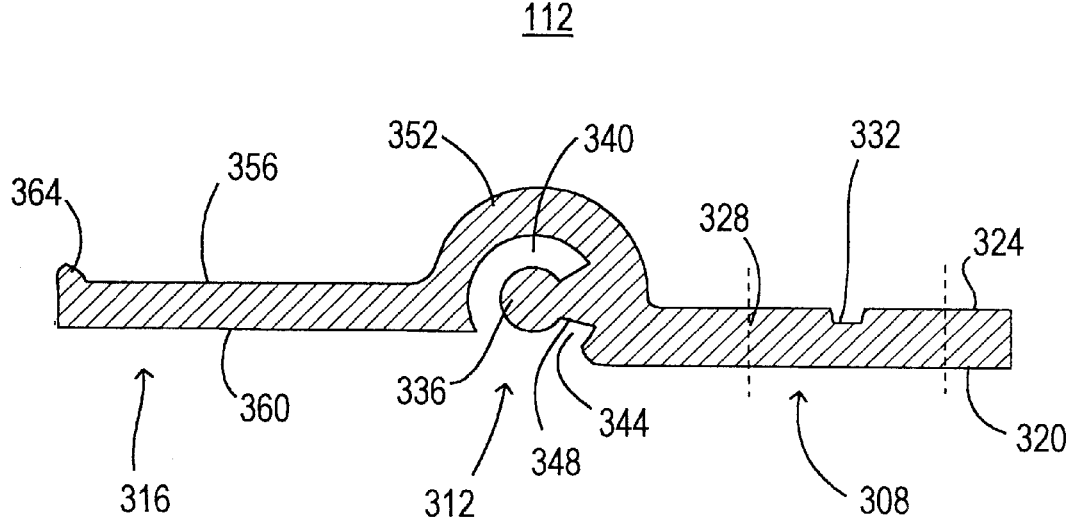
FIG. 3 is a cross-section of a mounting adaptor constructed in accordance with one embodiment of the present invention.

A mounting adaptor in accordance with the present invention is illustrated in cross-section in FIG. 3. The mounting adaptor, identified generally as mounting adaptor 112 includes an attachment portion 308, a beaded portion 312, and an alignment portion 316. The attachment portion 308 generally includes a planar lower portion 320 and a planar upper portion 324. The attachment portion 308 is further provided with hole 328 (not visible in FIG. 3, see FIG. 4), adapted to receive fastener 116 (see FIG. 1). Attachment portion 308 is additionally provided with reduced section 332. Reduced section 332 is, in the embodiment illustrated in FIG. 3, located so that it intersects the hole 328 in the attachment portion 308.

Adjacent to the attachment portion 308 is the beaded portion 312. The beaded portion 312 generally includes bead 336, upper channel portion 340 and lower channel portion 344. The channels 340 and 344 are formed between the bead 336 and the upper radius 352 of the mounting adaptor 112. The bead 336 of the beaded portion 312 is spaced apart from the upper radius 352 of the mounting adaptor 308 by leg 348, such that bead 336 is generally centered within the circle described by the upper radius 352.

Extending from the upper radius 352 of the mounting adaptor 112 is the alignment portion 316. The alignment portion 316 generally includes upper planar surface 356 and lower planar surface 360. Upper planar surface 356 and lower planar surface 360 are substantially parallel to each other, and they are in turn substantially parallel to the upper planar surface 324 and lower planar surface 320 of the attachment portion 308. Extending from the upper planar surface 356 of the alignment portion 316 is alignment lip 364. The alignment lip 364 is adapted to slidably engage the alignment channel 228 of the panel support member 108.

The exact dimensions and configuration of the bead 336, the upper channel portion 340, the lower channel portion 344, and the leg 348 are selected so that the surfaces of the first channel portion 204 of the panel support member 108 closely mate with the surfaces of the beaded portion 312 of the mounting adaptor 112. Preferably, when the panel support member 108 and the mounting adaptor 112 are interconnected, the space generally defined beneath the upper radius 352 of the mounting adaptor 112 by the bead 336, upper and lower channel portions 340 and 344, and the leg 348 is substantially filled at least down to a plane or slightly below a plane extending from the lower planar surface 320, by the first channel portion 204 of the panel support member 108. Indeed, the only requirements for the beaded portion 312 and the first channel portion 204 is that they, alone or in cooperation with the alignment portion 212 of the panel support member 108 and the alignment portion 316 of the mounting adaptor 112, prevent movement of the panel support member 108 relative to the mounting adaptor 112 in all directions except along a line perpendicular to the side elevation of FIG. 1, or the cross-sections of FIGS. 2 and 3 (i.e. along the longitudinal axis of the panel support member 108). Therefore, the configurations of the "beaded" portion 312 and the first channel portion 204 can be any suitable complementary configurations which prevent such movement.

In the illustrated embodiment, the mounting adaptor 112 has a width of approximately 3.5", a length of approximately 2.75", and a height of approximately 0.5". Moreover, the attachment portion 308 of the mounting adaptor 112 of the illustrated embodiment has a nominal thickness of about 0.125", while at the reduced section 332 the minimum thickness of the attachment portion 308 is about 0.03". The outer radius of the upper radius 352 is approximately 0.3", the outside radius of upper and lower channels 340 and 344 is approximately 0.2", the diameter of the bead 336 is approximately 0.15", and the length of the leg 348 is about 0.25". With respect to the alignment portion 316 of the mounting adaptor 112, the nominal thickness is about 0.125", while the maximum thickness of about 0.17" occurs at the alignment lip 364. However, the dimensions can be varied to suit any desired application.

Figure 4:
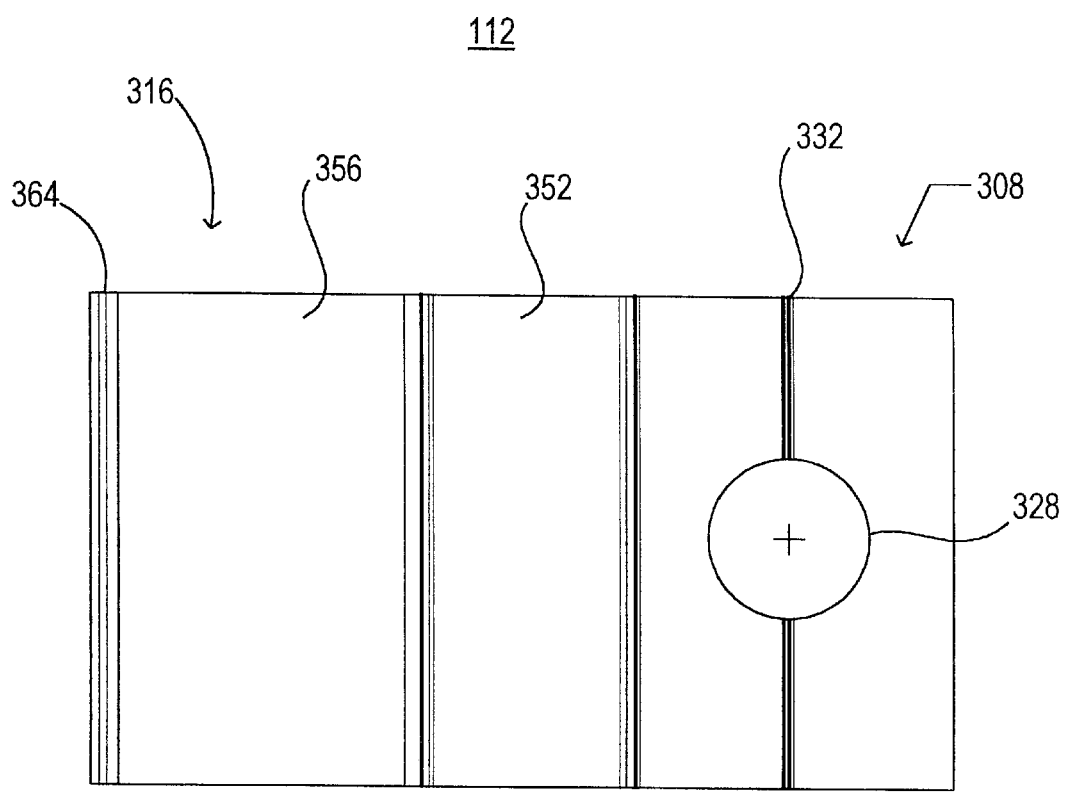
FIG. 4 is a plan view of a mounting adaptor constructed in accordance with one embodiment of the present invention.

With reference now to FIG. 4, illustrating a top or plan view of the mounting adaptor 112 illustrated in cross-section in FIG. 3, it is possible to see the proportions of the length and width of the illustrated embodiment. Furthermore, it can readily be seen that the hole 328 is generally centered in the attachment portion 308. In addition, it can be seen that the reduced section 332 is bisected by the hole 328.

With reference again to FIG. 1, the interconnection of the panel support member 108, the mounting adaptor 112, the fastener 116, and the mounting clamp 120 can readily be seen. Generally, the first channel section 204 of the panel support member 108 is received by the beaded portion 312 of the mounting adaptor 112. As illustrated in FIG. 1, the first channel portion 204 of the panel support member 108 and the beaded portion 312 of the mounting adaptor 112 are closely mated, so that the mounting adaptor 112 may be engaged with the panel support member 108 by aligning it and then sliding it onto the panel support member 108 in a direction perpendicular to the view of the illustration (i.e. in a direction parallel to the longitudinal axis of the panel support member 108). Thus interconnected, the mounting adaptor 112 is free to move along a line perpendicular to the view of FIG. 1, but is prevented from moving in all other directions.

To provide further support against unwanted relative movement of the panel support member 108 and the mounting adaptor 112, the lower surface 360 of the alignment portion 316 of the mounting adaptor 112 is adapted to interface with the alignment surface 216 of the alignment portion 212 of the panel support member 108. Furthermore, the distal portion 224 of the alignment leg 220 engages the upper surface 356 of the alignment portion 316 of the mounting adaptor 112. As an additional means to maintain the desired relationship between the panel support member 108 and the mounting adaptor 112, the lip 364 of the alignment portion 316 of the mounting adaptor 112 is received by the channel 228 of the panel support member 108 in a closely fitting relationship.

With the panel support member 108 and the mounting adaptor 112 interconnected as above-described, the mounting adaptor 112 may be positioned along the length of the panel support member 108 by sliding it to the desired position. Typically, the mounting adaptor 112 is positioned such that the hole 328 is concentrically aligned with a hole (not illustrated) provided in the upper surface of the mounting clamp 120. Thus aligned, a fastener 116 may be extended through the hole 328 of the mounting adaptor 112 and into the hole (not illustrated) of the mounting clamp 120. In a preferred embodiment, the space between the lower planar surface 360 of the mounting adaptor 112 and the adjacent surface of the mounting clamp 120 is slightly less than the thickness of the alignment portion 212 of the panel support member 108 as measured from the upper alignment surface 216 to the bottom of the panel support member 108. With such a configuration, tightening the fastening device 116 against the mounting adaptor 112 clamps the panel support member 108 between the mounting adaptor 112 and the top surface of the mounting clamp 120. In this way, the panel support member 108 is prevented from moving relative to the mounting adaptor 112 along the longitudinal axis of the first channel 204 (i.e. perpendicular to the view of FIG. 1 and the cross-sections of FIGS. 2 and 3).

Although the present invention has been discussed in terms of a particular illustrated embodiment, it should be noted that other configurations may be employed. For example, the channel portion 204 of the panel support member 108 need not be in a generally circular shape, as in the illustrated embodiment. All that is required is that it be shaped to allow movement along the line perpendicular to a cross section of the panel support member 108 when mated with a corresponding section of the mounting adaptor 112. Similarly, the alignment portion 212 of the panel support member 108 may be of any configuration capable of maintaining the desired relationship between the panel support member 108 and the mounting adaptor 112. Also, it should be noted that the second channel portion of panel support member 108 need not be supplied with an additional panel member where the appearance of the panel support member 108 need not be changed.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A mounting system that comprises:

a mounting clamp;

a mounting adaptor that comprises first, second, and third adaptor portions, wherein said first adaptor portion is disposed on said mounting clamp and comprises a first hole, and wherein said second adaptor portion is disposed between said first and third adaptor portions in an end view of said mounting adaptor;

a fastener that extends through said first hole in said first adaptor portion of said mounting adaptor and into said mounting clamp, wherein said fastener interconnects said mounting adaptor with said mounting clamp;

a cross member that comprises first and second legs, wherein said first leg extends away from said second leg in an end view of said cross member, wherein a first portion of said first leg is disposed above said mounting clamp, and wherein a first portion of said second leg is disposed in is front of said mounting clamp; and first means for slidably interconnecting said first leg of said cross member with said second portion of said mounting adaptor.

2. The mounting system of claim 1, wherein:

said second adaptor portion comprises a raised portion that is longitudinally extending and that comprises inner and outer walls, a first hollow space that is disposed under said raised portion, that is defined by said inner wall, and that is longitudinally extending, and a beaded portion that extends from a portion of said inner wall of said raised portion within said first hollow space and that is longitudinally extending.

3. The mounting system of claim 2, wherein:

a free end of said first leg of said cross member comprises a channel portion, wherein said channel portion of said first leg slidably interfaces with said beaded portion of said second adaptor portion within said first hollow space.

4. The mounting system of claim 1, wherein:

said first leg of said cross member comprises a first free end, and wherein said second adaptor portion of said mounting adaptor is disposed over said first free end of said cross member.

5. The mounting system of claim 1, wherein:
said first leg of said cross member is disposed directly on said mounting clamp, and wherein said third adaptor section is disposed directly on said first leg.

6. The mounting system of claim 1, wherein:
said third adaptor section comprises a free end that is opposite that which interfaces with said second adaptor section, wherein said free end of said third adaptor section comprises an alignment lip.

7. The mounting system of claim 1, wherein:
said first means for slidably interconnecting comprises first means for slidably interconnecting a free end of said first leg with said second adaptor section.

8. The mounting system of claim 1, further comprising:
means for limiting relative movement between said mounting adaptor and said cross member to a direction that is parallel with a longitudinal extent of said cross member.

9. The mounting system of claim 1, further comprising:
second means for slidably interconnecting said cross member with said third adaptor section.

10. The mounting system of claim 9, wherein:
said first and second means for slidably interconnecting allow relative movement between said mounting adaptor and said cross member along first and second lines that are parallel to each other.

11. A mounting adaptor that comprises:
a first adaptor section that comprises a first fastener hole and that may be disposed on a mounting clamp, wherein a fastener may be directed through said first fastener hole to interconnect said mounting adaptor and said mounting clamp;
a second adaptor section, wherein said second adaptor section comprises first means for slidably interconnecting said mounting adaptor with a first cross member whereby said mounting adaptor interconnects said first cross member with said mounting clamp; and
a third adaptor section, wherein third adaptor section comprises second means for slidably interconnecting said mounting adaptor with said first cross member, wherein said second adaptor section is disposed between said first and third adaptor sections in an end view of said mount adaptor.

12. The mounting adaptor of claim 11, wherein:
said first and second means for slidably interconnecting allow relative movement between said mounting adaptor and said first cross member in a direction that is parallel with a longitudinal extent of said first cross member.

13. The mounting system of 11, further comprising:
means for limiting relative movement between said mounting adaptor and said first cross member to a direction that is parallel with a longitudinal extent of said first cross member.

14. A mounting adaptor that comprises:
a one-piece body that comprises:
  a first adaptor section that comprises a first fastener hole and that maybe disposed on a mounting clamp, wherein a fastener may be directed through said fist fastener hole to interconnect said mounting adaptor and said mounting clamp;
  a second adaptor section that comprises a raised portion that is longitudinally extending, wherein said raised portion comprises inner and outer walls, wherein said inner wail defines a first hollow space that is disposed under said raised portion, that is defined by said inner wall, and that is longitudinally extending, and wherein said second adaptor section further comprises a beaded portion that cantilevers from a portion of said inner wall of said raised portion within said first hollow space and that is also longitudinally extending, wherein said beaded portion provides for interconnection of a first cross member with said mounting adaptor; and
  a third adaptor section, wherein said second adaptor section is disposed between said first and third adaptor sections in an end view of said mounting adaptor, and wherein said first and third adaptor sections are parallel with each other and disposed in vertically offset relation.

15. A mounting system that comprises:
first and second mounting clamps;
first and second mounting adaptors, wherein each of said first and second mounting adaptors comprises first and second mounting adaptor portions, wherein said first mounting adaptor portion of said first mounting adaptor is disposed on said first mounting clamp, and wherein said first mounting adaptor portion of said second mounting adaptor is disposed on said second mounting clamp;
first and second fasteners that anchor said first adaptor portion of said first and second mounting adaptors, respectively, to said first and second mounting clamps, respectively;
a cross member; and
first and second means for detachably interconnecting said cross member with said second adaptor portion of said first and second mounting adaptors, respectively.

16. The mounting system of claim 15, wherein:
said first adaptor portion of each of said first and second mounting adaptors comprises a first hole, wherein said first and second fasteners extend through said first hole on said first and second mounting adaptors, respectively, and into said first and second mounting clamps, respectively.

17. The mounting system of claim 15, wherein:
said cross member comprises first and second legs, wherein said first leg extends away from said second leg in an end view of said cross member, wherein said first leg extends over each of said first and second mounting clamps, wherein said second leg extends in front of each of said first and second mounting clamps, and wherein said means for detachably interconnecting comprises a free end of said first leg.

18. The mounting system of claim 15, wherein:
said second adaptor portion of each of said first and second mounting adaptors comprises a raised portion that is longitudinally extending and that comprises inner and outer walls, a first hollow space that is disposed under said raised portion, that is defined by said inner wall, and that is longitudinally extending, and a beaded portion that extends from a portion of said inner wall of said raised portion within said first hollow space and that is longitudinally extending, wherein said means for detachably interconnecting comprises said beaded portion.

19. The mounting system of claim 15, wherein:
said first and second means for detachably interconnecting comprise first and second means for slidably interconnecting said cross member with said second adaptor portion of said first and second mounting adaptors, respectively.

20. The mounting system of claim 15, further comprising:
means for limiting relative movement between each of said first and second mounting adaptors and said cross member to a direction that is parallel with a longitudinal extent of said cross member.

21. A method for interconnecting a cross member with a mounting surface comprising the steps of:

attaching a first mounting clamp to said mounting surface;

positioning a first mounting adaptor along a length of said cross member, wherein said positioning step comprises sliding said first mounting adaptor along said cross member and resisting any relative motion other than said sliding step between said first mounting adaptor and said cross member;

attaching said first mounting adaptor to said first mounting clamp;

positioning a second mounting adaptor along said cross member, wherein said positioning a second mounting adaptor step comprises sliding said second mounting adaptor along said cross member and resisting any relative motion other than said sliding said second mounting adaptor step between said second mounting adaptor and said cross member; and attaching said second mounting adaptor to said second mounting clamp, wherein both of said first and second mounting adaptors fail to span an entire distance between said first and second mounting clamps after said attaching said first and second mounting adaptor steps.

22. The method of claim 21, wherein:
said attaching said first mounting adaptor step is executed after said positioning a first mounting adaptor step.

23. The method of claim 21, wherein:
said positioning a second mounting adaptor step is executed after said attaching said first mounting adaptor step.

24. The mounting system of claim 18, wherein:
said cross member comprises a free end that in turn comprises a channel portion, wherein said channel portion of said first leg slidably interfaces with said beaded portion of said second mounting adaptor portion within said first hollow space for each of said first and second mounting adaptors.

25. The mounting system of claim 18, wherein:
each of said first and second mounting adaptors further comprise a third mounting adaptor portion, wherein said second mounting adaptor portion is disposed between said first and third mounting adaptor portions in an end view for each of said first and second said mounting adaptor; and said cross member comprises first and second legs, wherein said first leg extends away from said second leg in an end view of said cross member, wherein displaced portions of said first leg are disposed above said first and second mounting clamps, and wherein displaced portions of said second leg are disposed in front of said first and second mounting clamps.

26. The mounting system of claim 25, wherein:
said first leg of said cross member is disposed directly on top of said first and second mounting clamps, and wherein said third mounting adaptor portion of each of said first and second mounting adaptors is disposed directly on top of said first leg of said cross member.

27. The mounting system of claim 25, wherein:
said third mounting adaptor portion of each of said first and second mounting adaptors comprises a free end that is opposite that which adjoins with its corresponding said second mounting adaptor portion, wherein said free end of said third mounting adaptor portion of each of said first and second mounting adaptors comprises an alignment lip, wherein said cross member comprises an alignment channel, and wherein said alignment lip of each of said first and second mounting adaptors is disposed in displaced portions of said alignment channel of said cross member.

28. The mounting system of claim 15, wherein:

each of said first and second mounting adaptors further comprise a third mounting adaptor portion, wherein said second mounting adaptor portion is disposed between said first and third mounting adaptor portions in an end view for each of said first and second said mounting adaptors and wherein said mounting system further comprises:

third and fourth means for detachably interconnecting said cross member with said third mounting adaptor portion of each of said first and second mounting adaptors, respectively.

29. The mounting system of claim 28, wherein:

said first, second, third, and fourth means for detachably interconnecting allow relative movement between said first and second mounting adaptors and said cross member only along first and second lines that are parallel to each other and along a length dimension of said cross member.

30. The mounting system of claim 15, wherein:

each of said first and second mounting adaptors further comprise a third mounting adaptor portion, wherein said second mounting adaptor portion is disposed between said first and third mounting adaptor portions in an end view for each of said first and second said mounting adaptors; and said first and third mounting adaptor portions of each of said first and second mounting adaptors are vertically offset and disposed in parallel relation.

31. The mounting system of claim 15, wherein:

said cross member comprises a first free end, and wherein said second mounting adaptor portion of each of said first and second mounting adaptors is disposed over displaced portions of said first free end of said cross member.

32. The mounting system of claim 15, wherein:

said cross member comprises a first leg that in turn comprises a plurality of holes spaced at regular intervals, wherein said first leg is disposed above said first and second mounting clamps.

33. The method of claim 21, wherein:

said cross member comprises a first leg that in turn comprises a plurality of holes spaced at regular intervals, wherein said positioning a first and second mounting adaptor steps each allow said cross member to be attached to said first and second mounting clamps even though none of said plurality of holes is properly aligned with either of said first and second mounting clamps.

34. The method of claim 21, wherein:

said attaching said first and second mounting adaptor steps step comprise directing first and second fasteners through said first and second mounting adaptors, respectively, and into said first and second mounting clamps, respectively.

35. A method for interconnecting a cross member with a mounting surface, comprising the steps of:
   attaching first and second mounting clamps to displaced locations on said mounting surface;
   positioning first and second mounting adaptors on said cross member such that both of said first and second mounting adaptors fail to span an entire distance between said first and second mounting clamps after said positioning step;
   passing a first fastener through said first mounting adaptor and into said first mounting clamp; and
   passing a second fastener through said second mounting adaptor and into said second mounting clamp.

* * * * *

UNITED STATES PATENT AND TRADEMARK OFFICE
CERTIFICATE OF CORRECTION

PATENT NO.    : 6,470,629 B1
DATED         : October 29, 2002
INVENTOR(S)   : Haddock It is certified that error appears in the above-identified patent and that said Letters Patent is hereby corrected as shown below:

Column 8,
Line 43, please delete "in is" and insert therefor -- in --

Column 11,
Line 50, please delete "adaptor;" and insert therefor -- adaptors; --

Signed and Sealed this

Eighteenth Day of March, 2003

JAMES E. ROGAN
*Director of the United States Patent and Trademark Office*